United States Patent Office 3,064,830
Patented Nov. 20, 1962

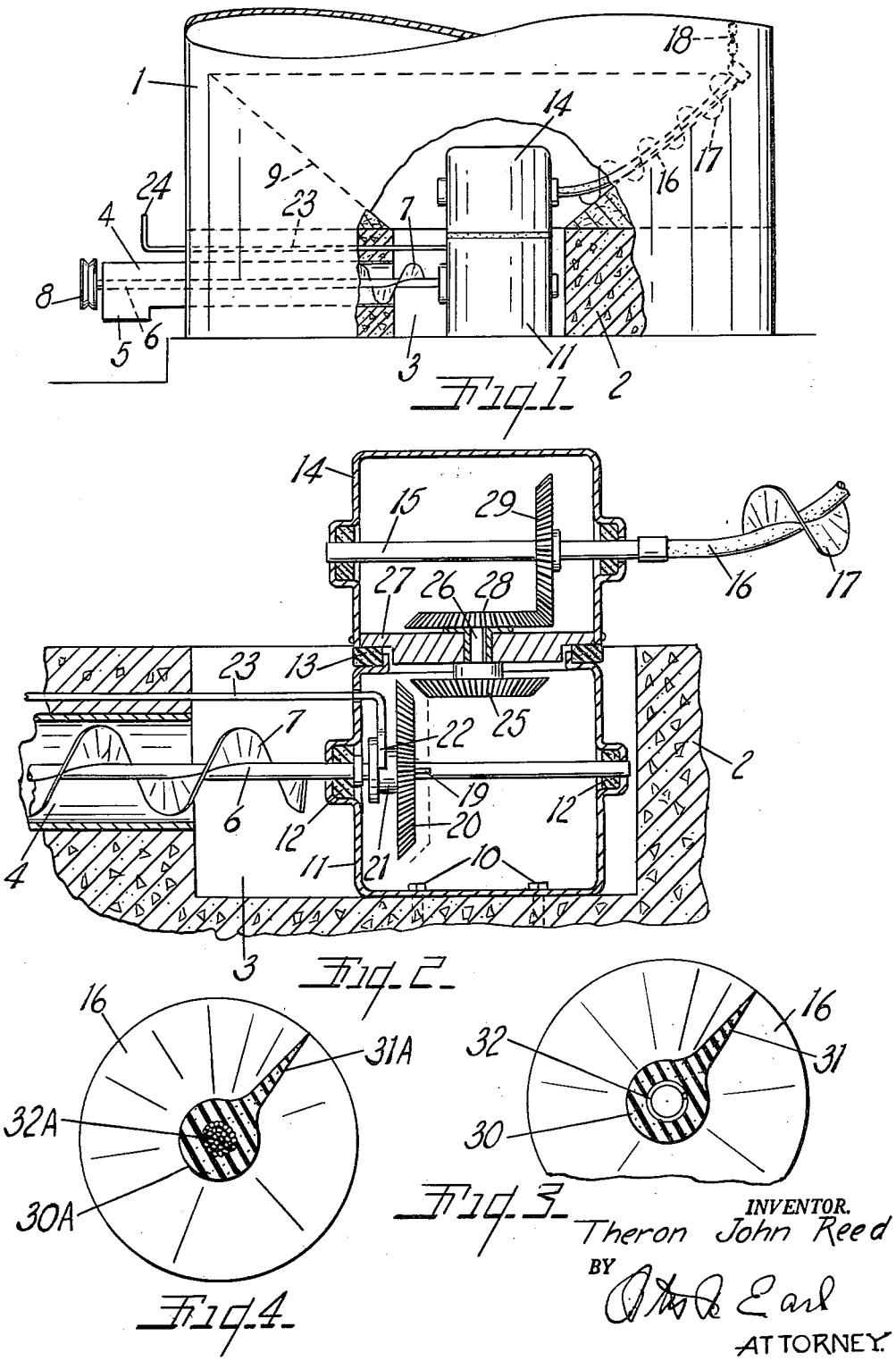

3,064,830
BIN UNLOADING SYSTEM AND FLEXIBLE CONVEYOR USED THEREIN
Theron John Reed, Burr Oak, Mich., assignor to Paul W. Sindlinger and John R. Nichols, both of Indianapolis, Ind.
Filed Oct. 6, 1960, Ser. No. 61,035
6 Claims. (Cl. 214—17)

This invention relates to improvements in bin unloading system and flexible conveyor used therein.

The principal objects of this invention are:

First, to provide a novel arrangement of conveyors for substantially and completely removing granular material from flat bottomed bins in which a flexible screw auger rotates around its axis to feed material toward the center of the bin and also travels around its axis to feed material toward the center of the bin and also travels around the bin to operate upon material on all portions of the bin floor.

Second, to provide a novel form of scavenging conveyor which is driven from one end and rests flexibly upon an inclined pile of material to progressively feed material toward the driven end of the conveyor and at the same time travel around its driven end to cover a circular area.

Third, to provide a bin unloading system having a relatively fixed auger arranged to deliver from the center of a bin and selectively connectable to a rotating and orbiting auger to drive the auger in feeding relation to the end of the fixed auger.

Fourth, to provide a novel form of screw auger which is sufficiently flexible to bend out of alignment with its driven end while still conveying material by rotation about its curved axis.

Other objects and advantages of the invention will be apparent from a consideration of the following description and claims.

The drawings, of which there is one sheet, illustrate a highly practical arrangement of the bin unloading system and two forms of flexible auger or conveyor useable therein.

FIG. 1 is a fragmentary side elevational view of a storage bin partially broken away in cross section to illustrate the arrangement of the bin unloading apparatus therein.

FIG. 2 is an enlarged fragmentary vertical cross sectional view through the bin unloading mechanism.

FIG. 3 is a fragmentary cross sectional view through the flexible auger taken along the plane of the line 3—3 in FIG. 2.

FIG. 4 is a cross sectional view similar to FIG. 3 illustrating a modified form of flexible auger.

The drawings illustrate a cylindrical bin or silo 1 mounted on a base 2 having a central recess or sump 3 formed in the base. A discharge tube 4 extends radially through the base from the sump 3 to the outer side of the base and is provided with a discharge mouth 5. A screw conveyor consisting of a shaft 6 and a spiral auger blade 7 is positioned within the tube to withdraw the granular material from the sump and deliver it to the mouth 5. Means such as the pulley 8 on the outer end of the shaft 6 are provided for rotating the auger 7. When the bin is to be emptied the auger 7 functions to withdraw material from the sump until the material in the silo reaches the inverted conical surface of repose indicated at 9 at which time the scavenging apparatus of the invention may be made operative to remove the remainder of the material. Mounted within the sump 3 and secured to the bottom thereof as by the screws 10 and offset from the center of the sump so as to expose the inner end of the auger 7 is a cylindrical housing 11 having bearings 12 in its side which support the shaft 6. The upper end of the housing 11 has a horizontal bearing 13 rotatably supporting an upper housing 14 having a cross shaft 15 journaled therein. A flexible shaft 16 is connected to one end of the shaft 15 and has a flexible spiral auger blade 17 secured thereto to extend radially from the upper housing 14 and angularly upwardly along the conical surface 9 of the material in the bin. As is indicated at 18 in FIG. 1, a chain may be connected to the outer end of the shaft 16 to hold the scavenging auger up in position while the bin is being filled. In operation, the chain 18 is loosened when it is desired to place the scavenging auger in operation. As appears more clearly from FIG. 2, the shaft 6 is provided with a spline 19 within the lower housing 11 on which a beveled gear 20 is slidably and drivingly connected to the shaft 6. The gear 20 has a shift collar 21 or other suitable shifting means that is engaged by the yoke 22 connected to the shift rod 23 that extends through the base to an operating handle 24 exteriorly of the base. By moving the shift rod 23 and gear 20 inwardly or toward the right, as viewed in FIG. 2, the gear 20 can be brought into driving engagement with a beveled gear 25 secured to the bottom of a shaft 26 journaled in the bottom wall 27 of the upper housing 14. Rotation of the outfeeding or delivery auger shaft 6 then causes the shaft 26 to rotate. Secured to the upper end of the shaft 26 is a third beveled gear 28 which meshes with a fourth beveled gear 29 secured to the cross shaft 15. Gears 25 and 28 form a sun gear means and their rotation causes rotation of the gear 29 and shaft 15 is so that the scavenging auger rotates about its axis to move material into the sump 3. Rotation of the auger 17 about its axis causes material to be displaced from the conical surface 9 and delivered to the sump for further delivery by the auger 7 so that the remaining material in the bin is progressively fed into the sump until the bin is substantially empty. The upper housing 14 and the cross shaft 15 also tend to rotate about the axis of shaft 26 but this tendency is resisted by egagement of the flexible auger 17 in the material. As the auger 17 eats away the pile 9, the auger automatically rotates with the housing to advance to additional material so that the scavenging conveyor automatically advances until the bin is empty.

FIG. 3 illustrates one form of the scavenging auger 16 in which a reinforced flexible tubular shaft 30 of rubber or similarly flexible material is provided with a radial projecting and spirally extending scavenging screw auger blade 31 also of rubber or other flexible material. The reinforced flexible shaft 30 has sufficient torsional strength to rotate the discharge auger blade 31 but is at the same time capable of flexing from the axis of the cross shaft 15 so that the auger rests by gravity on the surface of the material retaining in the bin. The flexibility of the spiral auger blade 31 permits a flexing of the shaft 29. A coil spring 32 may further reinforce the shaft 30.

In FIG. 4 there is illustrated a modified form of flexible auger in which a twisted wire cable 32A is molded within the solid rubber-like shaft 30A. The radial inner edge of the blade 31A may be molded or adhered to the shaft 30A so that the augers flexes angularly and rotates with the shaft. Either form of the flexible shaft and auger co-operates or functions in the bin emptying apparatus in the same way. In addition, the flexible augers and shafts are useable in other conveying installations and positions where it is necessary or desirable to have a single continuous screw auger operate along intersecting angle lines or around curves.

The apparatus is easily operated from the exterior of the bin and is simple ot manufacture and long-lived in operation since the scavenging conveyor operates only when the bin is nearly empty.

I have illustrated and described my invention in a highly practical embodiment thereof. I have not attempted to illustrate or describe other adaptations or embodiments which I contemplate, as I believe this disclosure will enable those skilled in the art to embody or adapt my invention as may be desired.

What is claimed as new is:

1. Bin unloading apparatus for a bin having a flat bottom comprising, a discharge tube opening between the interior and exterior of said bin, a first auger shaft extending through said tube, means attached to said shaft to rotate the same, a first spiral auger blade on said first shaft, a housing fixed in said bin toward the opposite side thereof from said first auger blade and having the inner end of said first shaft extending thereinto, an upper housing rotatably mounted on said first housing and projecting above the bottom of said bin, a cross shaft journaled in said upper housing, sun gear means rotatably mounted in said housings on an axis intersecting the axes of said shafts, a first drive gear on the inner end of said first shaft engaged with said sun gear means, a second drive gear on said cross shaft engaged with said sun gear means to form a gear train between said first shaft and said cross shaft, means actuatable from outside said bin to disconnect said gear train, a third shaft angularly swingably connected to the end of said cross shaft and projecting across the bottom of said bin, a flexible suspension element connected to the free end of said third shaft to support the shaft above the bottom of the bin while the bin is filled, and a spiral auger blade secured around said third shaft.

2. Bin unloading apparatus for a bin having a flat bottom with a discharge conveyor delivering from a central portion of the bottom of the bin, said apparatus comprising a scavenging auger having a flexible shaft arranged to swing vertically to conform to the surface of a remainder pile of material in said bin, a housing having a portion rotatably mounted centrally of the bottom of said bin and supporting the radially inner end of said shaft for horizontal angular swinging motion about said bin, a selectively releasable drive connection in said housing connected from said conveyor to rotate said shaft above its axis and having an orbital driving connection to said rotatable portion of said housing to rotate the housing and angularly swing the shaft when resistance to angular swinging thereof is reduced below a minimum, and means connected to drive said discharge conveyor.

3. Bin unloading apparatus for a bin having a flat bottom with a discharge conveyor delivering from a central portion of the bottom of the bin, said apparatus comprising a scavenging auger having a shaft arranged to swing vertically to engage the surface of a remainder pile of material in said bin, a suspension element connected to the end of said shaft to support the auger in elevated position while the bin is filled, a housing having a portion rotatably mounted centrally of the bottom of said bin and supporting the radially inner end of said shaft for angular swinging motion about said bin, a selectively releasable drive connection in said housing connected to rotate said shaft above its axis and having an orbital driving connection to said rotatable portion of said housing to rotate the housing and angularly swing the shaft when resistance to angular swinging thereof is reduced below a minimum, and means connected to drive said discharge conveyor.

4. Bin unloading apparatus for a bin having a flat bottom with a discharge conveyor delivering from a central portion of the bottom of the bin, said apparatus comprising a scavenging auger having a flexible shaft arranged to swing vertically to conform to the surface of a remainder pile of material in said bin, a housing having a portion rotatably mounted centrally of the bottom of said bin and supporting the radially inner end of said shaft for angular swinging motion about said bin, a selectively releasable drive connection in said housing connected to rotate said shaft about its axis and having an orbital driving connection to said rotatable portion of said housing to rotate the housing and angularly swing the shaft when resistance to angular swing thereof is reduced below a minimum, said drive connection being connected to be driven from said discharge conveyor, a suspension element connected to the end of said shaft to support the auger in elevated position while the bin is filled, and means connected to drive said discharge conveyor.

5. Bin unloading apparatus for a bin having a flat bottom with a discharge conveyor delivering from a central portion of the bottom of the bin, said apparatus comprising a scavenging auger having a shaft arranged to swing vertically to engage the surface of a remainder pile of material in said bin, a housing having a portion rotatably mounted centrally of the bottom of said bin and supporting the radially inner end of said shaft for angular swinging motion about said bin, a selectively releasable drive connection in said housing connected to rotate said shaft above its axis, an orbital driving connection between said shaft and said rotatable portion of said housing to rotate the housing and angularly swing the shaft, and means connected to drive said discharge conveyor.

6. In combination with a storage bin having a central dsicharge opening in the bottom thereof with an externally driven discharge auger and shaft projecting into said opening, a first gear housing fixedly positioned in said opening and having the end of the shaft of said discharge auger rotatably mounted therein, a second gear housing rotatably mounted on top of said first gear housing and having a transverse shaft projecting through the side of the second housing above the bottom of said bin, selectively engageable and disengageable gearing in said gear housing connecting said shaft of said afirst auger with said transverse shaft and permitting rotation of said second gear housing on said first gear housing, a flexible shaft uniformly flexible throughout its length connected to the end of said transverse shaft and overlying the bottom of said bin, and a scavenging auger secured around said flexible shaft, said scavenging auger being of continuous flexible material and being uniformly transversely flexible.

References Cited in the file of this patent

UNITED STATES PATENTS

| 844,693 | Seidel | Feb. 19, 1907 |
| 1,710,759 | Wunderlich | Apr. 30, 1929 |
| 2,438,637 | Jansen | Mar. 30, 1948 |
| 2,551,216 | Martin | May 1, 1951 |
| 2,888,128 | Allen | May 26, 1959 |